United States Patent [19]
Roth et al.

[11] Patent Number: 5,759,324
[45] Date of Patent: Jun. 2, 1998

[54] PROCESS FOR BONDING BY ADHESION OF A COVER TO A SHAPED PADDING, IN PARTICULAR OF POLYURETHANE FOAM

[75] Inventors: Jacques Roth, Strasbourg; Alain Manigold, Romanswiller, both of France

[73] Assignee: Roth Freres (Societe Anonyme), Strasbourg, France

[21] Appl. No.: 608,816

[22] Filed: Feb. 29, 1996

[51] Int. Cl.$^6$ .................................................. B32B 31/20
[52] U.S. Cl. .................... 156/152; 156/214; 156/309.9; 156/321; 156/322; 156/331.7
[58] Field of Search .................... 156/212, 214, 156/322, 291, 152, 245, 321, 309.9, 295, 331.7

[56] References Cited

U.S. PATENT DOCUMENTS

| | | | |
|---|---|---|---|
| 3,850,725 | 11/1974 | Spielau et al. | 156/322 |
| 4,194,938 | 3/1980 | Figge et al. | 156/322 |
| 4,619,725 | 10/1986 | Muraishi et al. | 156/214 |
| 4,655,868 | 4/1987 | Hefele | 156/238 |
| 4,722,760 | 2/1988 | Shimada | 156/214 |
| 4,929,304 | 5/1990 | Urai et al. | 156/245 |
| 5,294,386 | 3/1994 | Roth et al. | |
| 5,486,252 | 1/1996 | Wong | 156/212 |

FOREIGN PATENT DOCUMENTS

| | | |
|---|---|---|
| 0 169 188 | 1/1986 | European Pat. Off. . |
| 0227202 | 7/1987 | European Pat. Off. . |
| 0 442 691 | 8/1991 | European Pat. Off. . |
| 0506 555 | 12/1994 | European Pat. Off. . |
| 2 558 147 | 7/1985 | France . |
| 3-068391 | 3/1991 | Japan . |
| 3-203626 | 11/1991 | Japan . |
| 3-258527 | 2/1992 | Japan . |
| 2 192 334 | 1/1988 | United Kingdom . |
| 2 202 434 | 9/1988 | United Kingdom . |
| 92/08601 | 5/1992 | WIPO . |
| 92/13707 | 8/1992 | WIPO . |

OTHER PUBLICATIONS

Patent Abstracts of Japan, Abstract of 3-258527, Feb. 17, 1992.
Patent Abstracts of Japan, Abstract of 3-203626, Nov. 29, 1991.
Patent Abstracts of Japan, Abstract of 63-213587, vol. 12, No. 501, Dec. 1988.
Patent Abstracts of Japan, Abstract of 3-068391, vol. 15, No. 228, Nov. 1991.

*Primary Examiner*—Richard Crispino
*Attorney, Agent, or Firm*—Harness, Dickey & Pierce P.L.C.

[57] ABSTRACT

The present invention relates to a process for the bonding by adhesion of a cover to a shaped padding, in particular of polyurethane foam, especially for the production of seat cushions. The process includes the step of arranging a cover (1) in a cold-shaping device (2) and fixing it thereto by means of a holding frame (3), then placing an adhesive (4) on the internal walls of the cover (1). The surface of the padding (5) intended to cooperate with the internal walls of the cover (1) is subsequently heated to a high temperature. After a predetermined temperature has been reached the heating is interrupted and the thus heated foam padding (5) is applied to the internal walls of the cover (1) coated with adhesive (4), so as to bring about instantaneous transmission of heat by direct contact with the adhesive (4) leading to extremely rapid setting thereof. The cold-shaping device (2) is then opened and the padding (5) equipped with its cover (1) is removed.

15 Claims, 15 Drawing Sheets

FIG_1

FIG_2

FIG_3

FIG._4

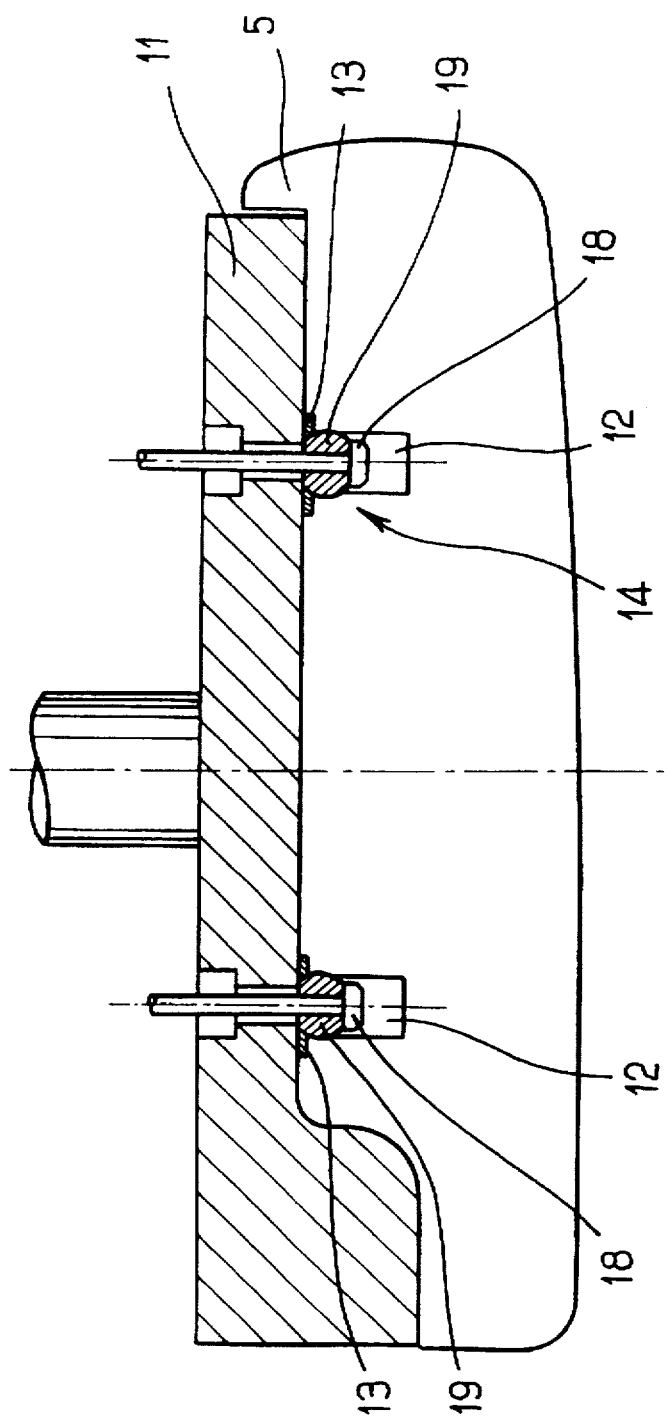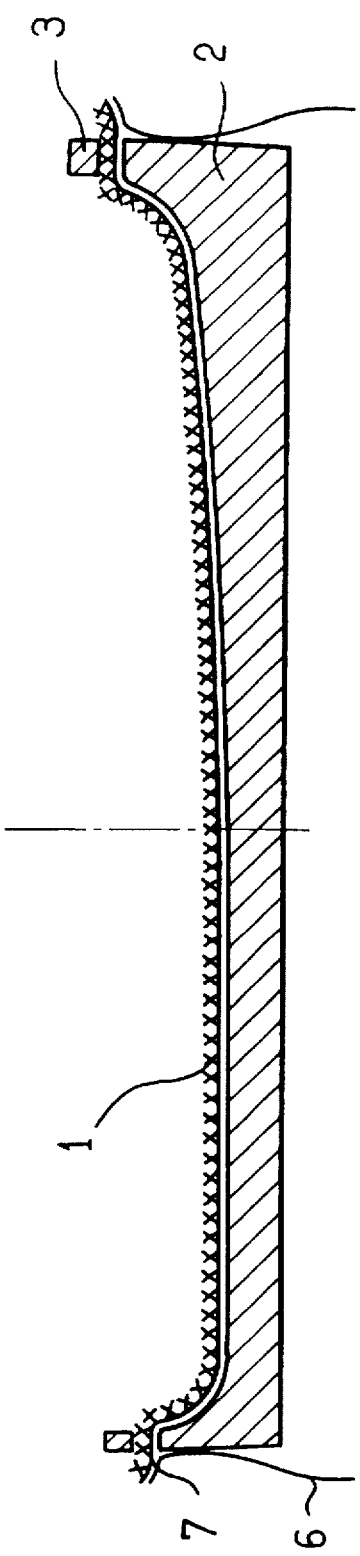
FIG. 7

FIG_8

FIG_9

FIG_10

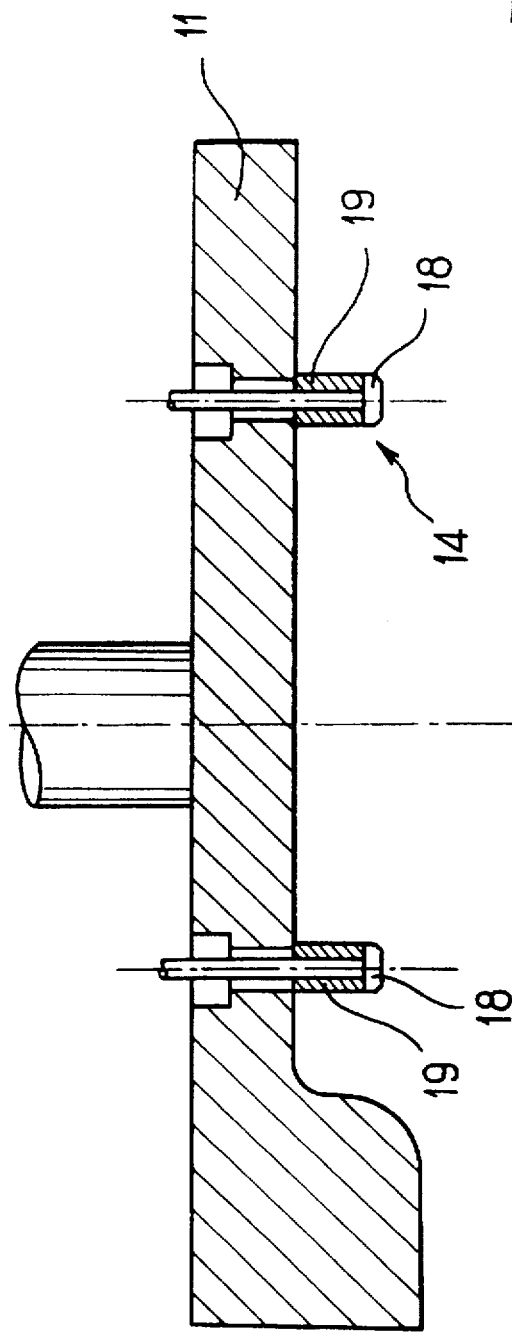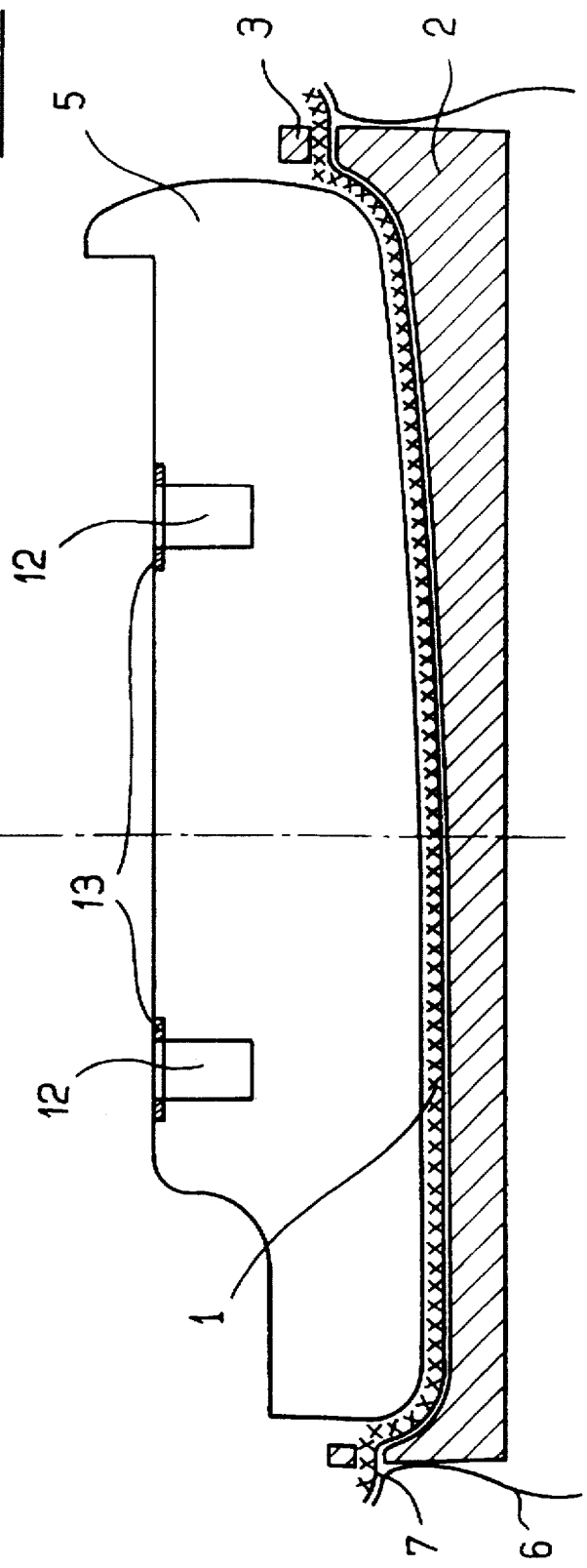
FIG. 11

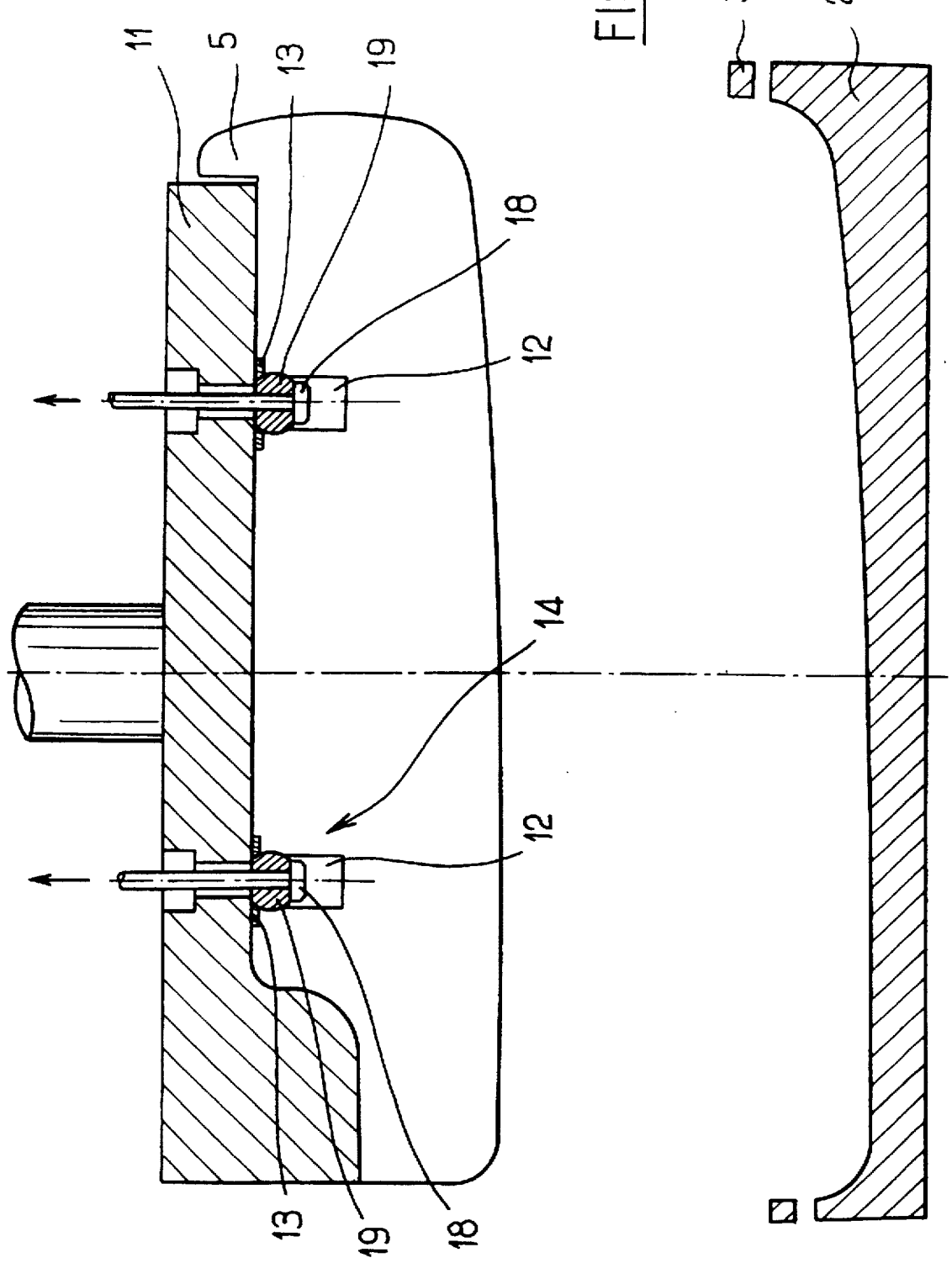

PROCESS FOR BONDING BY ADHESION OF A COVER TO A SHAPED PADDING, IN PARTICULAR OF POLYURETHANE FOAM

DESCRIPTION

The present invention concerns the sphere of production of shaped paddings, especially for seat cushions, and relates to a process for bonding by adhesion of a cover onto a shaped padding in particular of polyurethane foam, especially for the production of seat cushions.

The arrangement of a seat cushion cover in a mold or a shaping device with the visible face of the cover matching the internal walls of the mold or shaping device and a shaped padding of foam or similar material previously coated with adhesive being applied with a certain amount of pressure to the internal walls of the thus arranged cover, allows the acquisition, after setting of the adhesive, of a foam cushion to which the cover adheres owing to the adhesive while consequently matching all the contours and reliefs of the foam padding.

However, the good adhesion of the shaped padding, in particular of molded polyurethane foam, depends on the quality of the fine molding skin constituting the surface of any molded polyurethane foam padding.

Thus, a padding made of molded foam known as cold cure foam, for which the release agent deposited in the mold is a wax in solution in a solvent, has a permeable, largely porous surface skin which is favorable to good adhesion during the operation of sticking the foam padding to the cover.

On the other hand, a padding made of molded foam known as hot cure foam, for which the release agent deposited in the mold will be a wax in an aqueous dispersion, has a relatively thick, smooth and barely permeable surface skin which is very unfavorable toward good adhesion during the operation of sticking the foam padding to the cover and necessitates elimination of the skin by brushing prior to the sticking operation.

For economic industrialization of the above mentioned process, moreover, it is necessary to reduce to a minimum the time for setting by drying, curing or polymerization of the adhesive.

The bonding process most commonly employed at present involves bringing the mold or the shaping device to a relatively high temperature of the order of 80° to 120° Centigrade so that when the adhesive-coated padding is applied to the cover lining the mold or the shaping device, the temperature of the mold or the shaping device propagates through the fabric to the adhesive, thus allowing the setting of said adhesive.

However, this known process has two serious drawbacks.

On the one hand, the time for propagation of the heat from the mold or shaping device through the fabric is prolonged, particularly when a fabric back foamed with a 2 mm to 5 mm thick foam layer is used.

Under these circumstances, even with rapidly polymerizing polyurethane adhesives, the setting time of the adhesive is between 40 seconds and 120 seconds, involving immobilization of the shaping tool and consequently a high production cost.

On the other hand, the fact that the visible face of the cover is necessarily applied to the walls of a heated mold or shaping device inevitably causes damage in the material constituting the cover, leading to a shine and obliteration of the grain in the case of PVC imitation leathers, markings, undesirable shot-silk effects, coatings of fibers in the case of velvet, jersey and other textiles. Consequently, so-called delustering operations with a brush or with steam are necessary.

These drawbacks can only be overcome by reducing the temperature of the mold or shaping device and this simultaneously leads to an increase in the adhesive setting time which can then reach 180 seconds.

It has also been proposed that the temperature be transferred more rapidly toward the adhesive in order to reduce the setting time thereof.

This process involves passing dry steam at a temperature of between 150° and 300° Centigrade through the foam padding, through the cover and then through perforations made in the base of the mold or shaping device.

In this way, the high temperature of the dry steam reaches the adhesive more rapidly, the setting time of the adhesive being reduced to about 30 seconds.

However, this process also has drawbacks.

In fact, the steam introduced into the cushion has to be removed and this involves connecting the base of the mold or shaping device to a source of vacuum which aspirates the steam then the external air in order to cool and dry the interior of the cushion. The cumulative times for removal of the steam, drying and setting of the adhesive consequently lead to a relatively long operation involving high investment costs and resulting in a high production cost. Finally, the high-temperature dry steam traversing the textile material can also damage said textile material.

Furthermore, when the cover consists of an impermeable material such as a PVC imitation leather or an impermeable textile fabric, the process is inoperable because the steam cannot pass through the cover.

Finally, there is at present no way of locking and precisely positioning the foam padding on the carrying tray which brings the adhesive-coated foam padding into contact with the cover placed in the shaping device. Now if the tray carrying the foam padding can be brought mechanically into a perfectly centered position on the shaping device, the foam padding of eminently flexible material without a gripping key is very difficult to lock and to position in a perfectly centered manner on the carrying tray. This results in random positioning, the foam padding consequently being imperfectly centered on the cover arranged in the shaping device with the result that the decorative cushions obtained have a quality, in particular appearance, which is open to criticism i.e. offset seams, creases, etc.

At present, a foam padding is centered and locked on a carrying tray by means of one or more rigid inserts, in particular of metal, incorporated in the foam and projecting from said foam, the projecting portions of insert being able to be locked mechanically, that is by engagement or by means of magnets, on the carrying tray.

However, a means of this type constitutes an obstacle to the recycling of the cushion at the end of its service life, the metal insert having to be disconnected from the foam for the separate recycling of the foam, on the one hand, and of the insert, on the other hand. Furthermore, these disposable metal centering and locking inserts are relatively bulky.

The object of the present invention is to overcome these drawbacks.

In fact, it relates to a process for the bonding by adhesion of a cover to a shaped padding, in particular of polyurethane foam, especially for the production of seat cushions, characterized in that it essentially involves arranging a cover in a cold-shaping device and fixing it thereto by means of a holding frame, then placing an adhesive on the internal walls of the cover, subsequently heating to a high temperature the surface of the padding intended to cooperate with the internal walls of the cover, interrupting heating after a predetermined temperature has been reached and immediately applying the thus heated foam padding to the internal walls of the cover coated with adhesive, so as to bring about instantaneous transmission of heat by direct contact with the adhesive leading to extremely rapid setting thereof, then opening the cold-shaping device and removing the padding equipped with its cover.

According to the invention, the process also relates to the initial positioning and locking of said shaped padding on a support, characterised in that it involves initially producing the foam padding by molding, providing it, on its supporting face intended to cooperate with a carrying tray, with cavities each provided with a positioning and locking means, mounting the padding on the carrying tray and locking it thereon by co-operation with expansible centering devices.

The invention will be understood better by means of the following description which relates to a preferred embodiment given as a non-limiting example and explained with reference to the accompanying schematic drawings, in which:

BRIEF DESCRIPTION OF THE DRAWINGS

FIG. 7 shows, in section, the positioning of a cover on a shaping device equipped with a holding frame according to a second embodiment;

FIG. 11 is a sectional view showing the opening of the shaping device after bonding of the cover;

FIGS. 14 and 15 are sectional views respectively showing the positioning and locking of the foam padding on the carrying tray.

Figure 1:
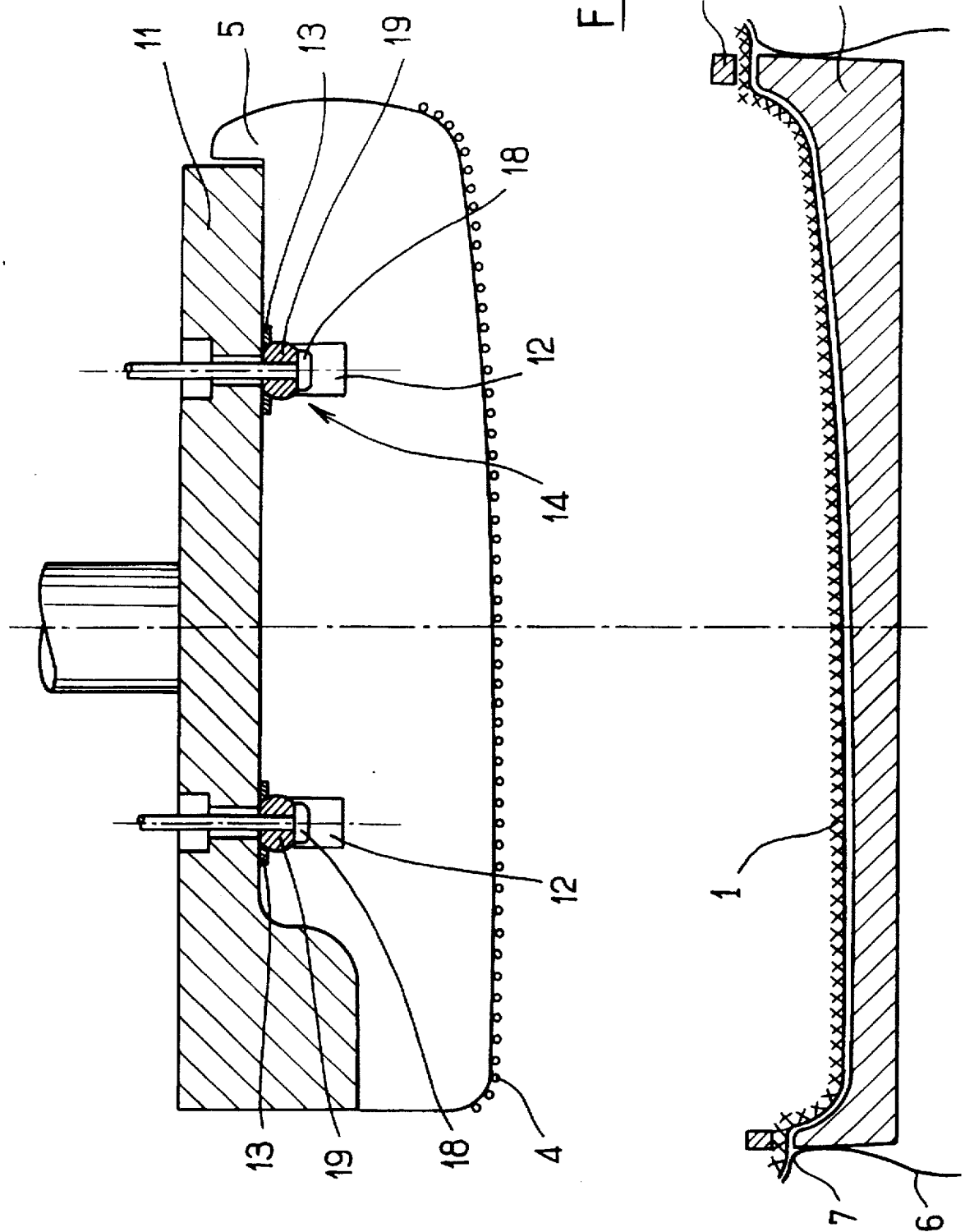
FIG. 1 shows, in section, the positioning of a cover on a shaping device equipped with a holding frame according to a first embodiment.

According to the invention and as shown more particularly by way of example in FIGS. 1 to 12 of the accompanying drawings, the process for the bonding by adhesion of a cover to a shaped padding, in particular of polyurethane foam, especially for the production of seat cushions, essentially involves arranging a cover 1 in a cold-shaping device 2 and fixing it thereto by means of a holding frame 3, then placing an adhesive 4 on the internal walls of the cover 1, subsequently heating to a high temperature the surface of the padding 5 intended to cooperate with the internal walls of the cover 1, interrupting heating after a predetermined temperature has been reached and immediately applying the thus heated foam padding 5 to the internal walls of the cover 1 coated with adhesive 4, so as to bring about instantaneous transmission of heat by direct contact with the adhesive 4 leading to extremely rapid setting thereof, then opening the cold-shaping device 2 and removing the padding 5 equipped with its cover 1.

The cold-shaping device 2 can be manufactured equally well from synthetic material, sheet metal, cast iron or various composite materials.

In the example shown in the accompanying drawings, the cover 1 can consist of a textile fabric back foamed with a 2 mm to 5 mm thick foam layer, the portion corresponding to the periphery of the cushion consisting of a sheet of imitation leather made of PVC 6 sewn to the textile fabric along a seam 7. This cover 1 is positioned on the shaping device 2 and is held in place by the holding frame 3.

Figure 2:
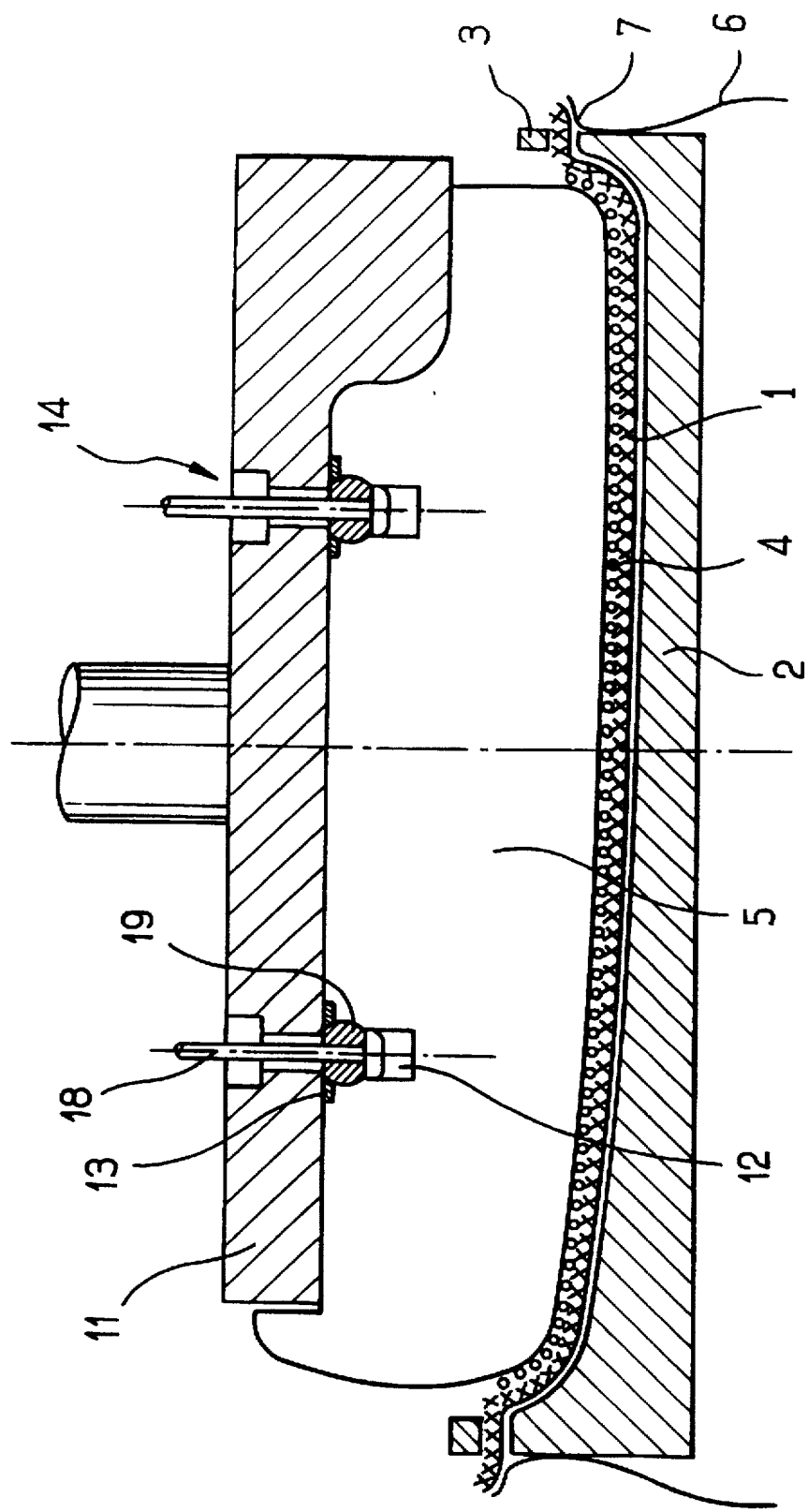
FIG. 2 shows the operation of applying adhesive to the internal face of the cover in a view similar to that in FIG. 1.
Figure 3:
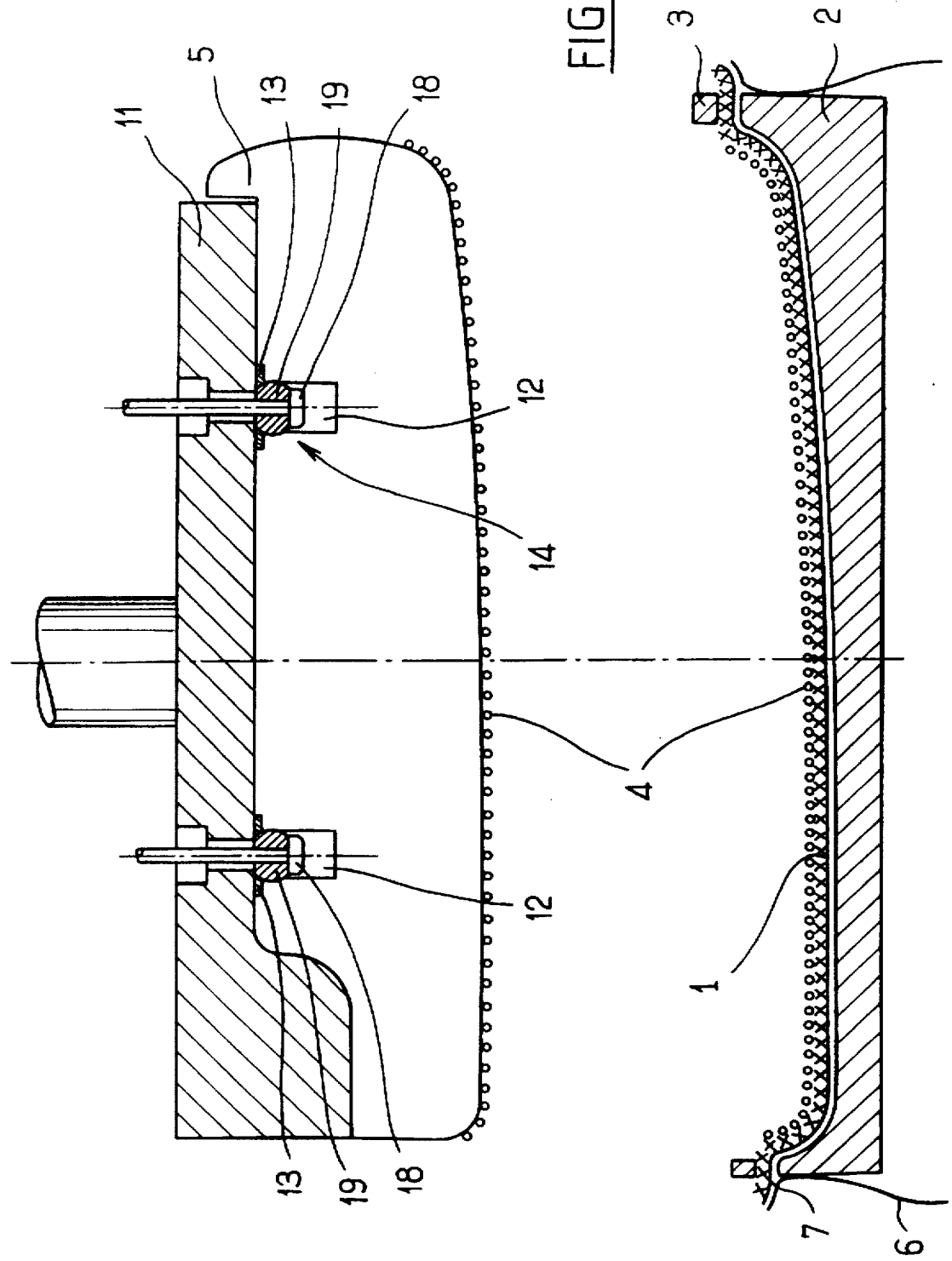
FIG. 3 is a view similar to that in FIG. 1 after the internal face of the cover has received adhesive.

According to a first embodiment of the invention and as shown schematically in FIGS. 1 to 3, the adhesive is applied indirectly by transfer of a portion of said adhesive 4 previously applied by spraying onto the foam padding 5 during the brief contact between the foam padding 5 and the internal walls of the cover 1.

The adhesive 4 is firstly applied by means of a gun by spraying onto the surface of the foam padding 5 at a separate sprinkling station dedicated to this operation, for example in a sprinkling cubicle similar to a painting cubicle.

The quantity of adhesive deposited on the surface of the foam padding 5 is between 40 grams and 60 grams per square meter.

FIG. 1 shows schematically a carrying tray 11 and a foam padding 5 coated with moist adhesive and locked thereon. The padding 5 is then lowered by means of the carrying tray 11 into contact with the shaping device 2 containing the cover 1 (FIG. 2). The foam padding 5 coated with moist adhesive is thus placed, for a short moment of 0.5 to 2 seconds, in contact with the internal walls of the cover 1, which has the effect of transferring a portion of said adhesive to said internal walls of the cover 1.

After this short moment, the carrying tray 11 is raised (FIG. 3), a portion of the adhesive having been transferred to the internal walls of the cover 1 and a further portion of the adhesive remaining on the surface of the foam padding 5. In fact, only a quarter to a third of the quantity of adhesive is transferred during this brief period of contact of the foam padding 5 onto the internal walls of the cover 1. Consequently, according to this first embodiment of the invention, as the quantity of adhesive initially deposited on the foam padding 5 is between 40 grams and 60 grams per square meter, only a quantity of 10 grams to 20 grams per square meter of said adhesive will have been transferred to the internal walls of the cover 1, a quantity of adhesive of 30 grams to 40 grams per square meter remaining on the foam padding 5.

This very small quantity of adhesive amounting to 10 grams to 20 grams per square meter which is very uniformly deposited on the internal walls of the cover 1 will allow excellent adhesion according to the invention while eliminating the risks of defects by collapse of the foam lining of said cover 1.

Figure 8:
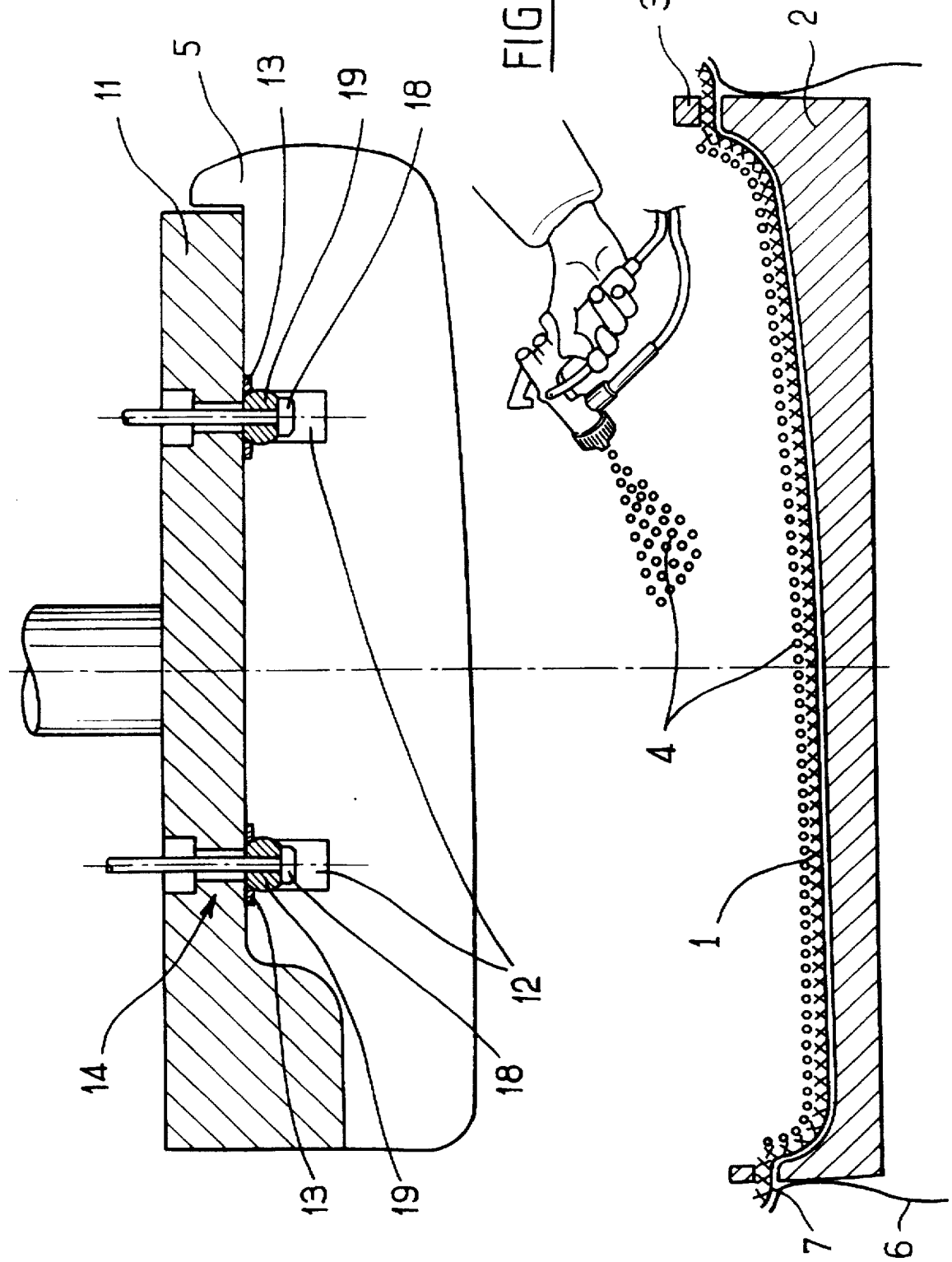
FIG. 8 shows the operation of applying the adhesive to the internal face of the cover in a view similar to that in FIG. 7.

According to a second embodiment of the invention and as shown schematically in FIG. 8, the adhesive 4 is applied directly by means of a gun by spraying onto the internal walls of the cover 1, in particular in the regions which are to be connected to the foam padding 5 so as to place a very fine layer of adhesive 4 on the foam lining of said cover 1.

The quantity of adhesive deposited in this way will preferably be between 40 grams and 60 grams per square meter.

As an example, the adhesive used will advantageously be a polyurethane adhesive containing 100% of dry extracts and having two components, that is 70% by weight of polyol having a molecular weight of 6000 and a hydroxyl index of 28, such as the one known by the trade name Bayer 3963 made by the company Bayer or a different polyol of the triol type, and 30% by weight of MDI type isocyanate, the mixture being activated by a an amine catalyst. In this case, a system of spraying using a spray gun with two components will preferably be employed.

Other adhesives can obviously also be used such as single component polyurethane adhesives containing 100% of dry extracts or additions of solvents, aqueous phase or solvent rubber adhesives, thermosetting type adhesives.

Figure 4:
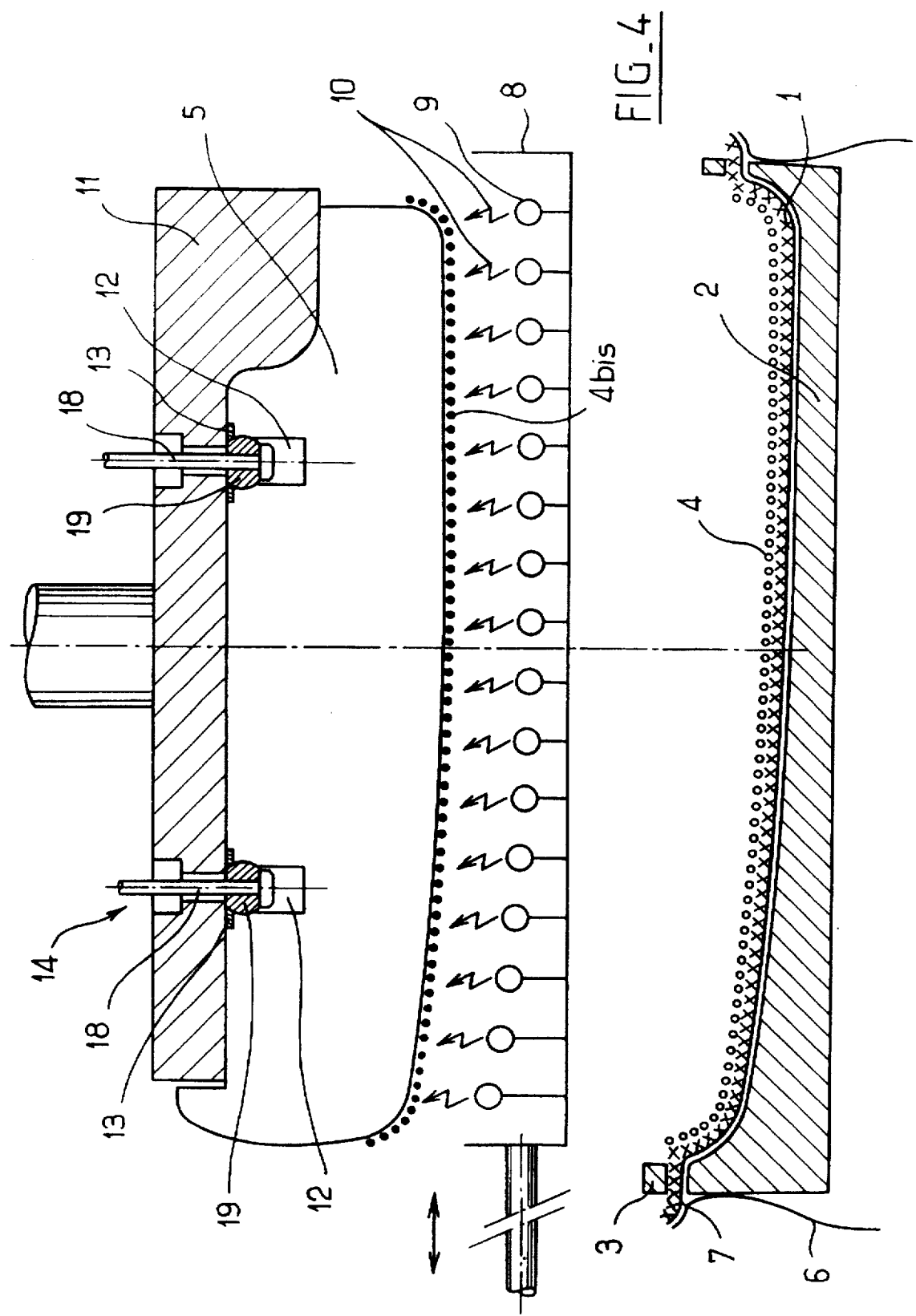
FIG. 4 is a view similar to that in FIGS. 1 to 3 showing the operation of heating the surface of the padding.
Figure 9:
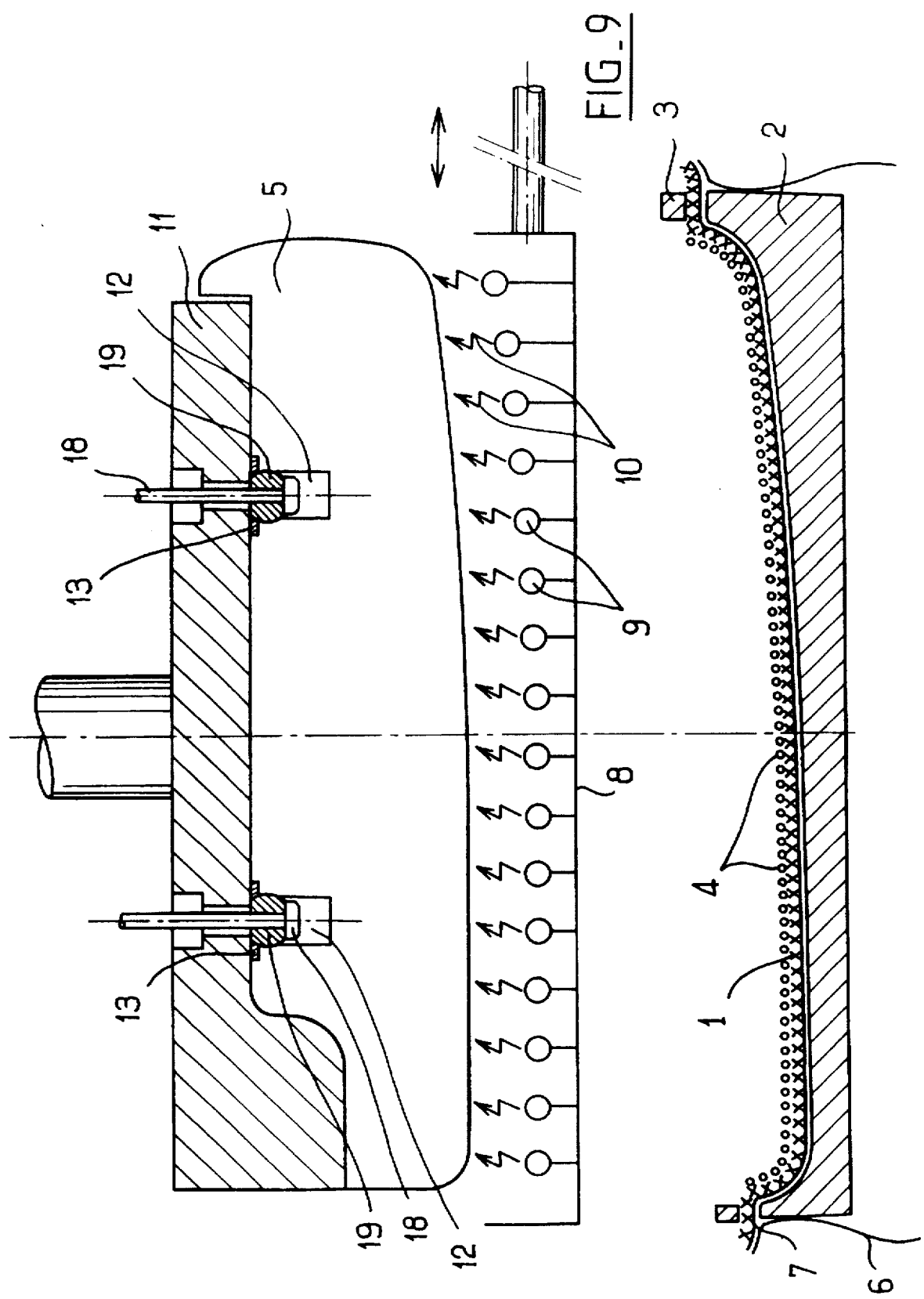
FIG. 9 is a view similar to that in FIGS. 7 and 8 showing the operation of heating the surface of the padding.

FIGS. 4 and 9 show schematically the rapid heating of the surface of the foam padding 5 in order to bring it to a temperature of the order of 170° to :190° Centigrade.

To this end, the invention employs a box 8 in which there are installed infrared lamps or tubes 9 brought to a temperature of between 1000° and 1400° Centigrade and mounted on supports which are adjustable relative to the base of the box 8 so that they are all at the same distance from the surface of the foam constituting the padding 5.

Figure 5:
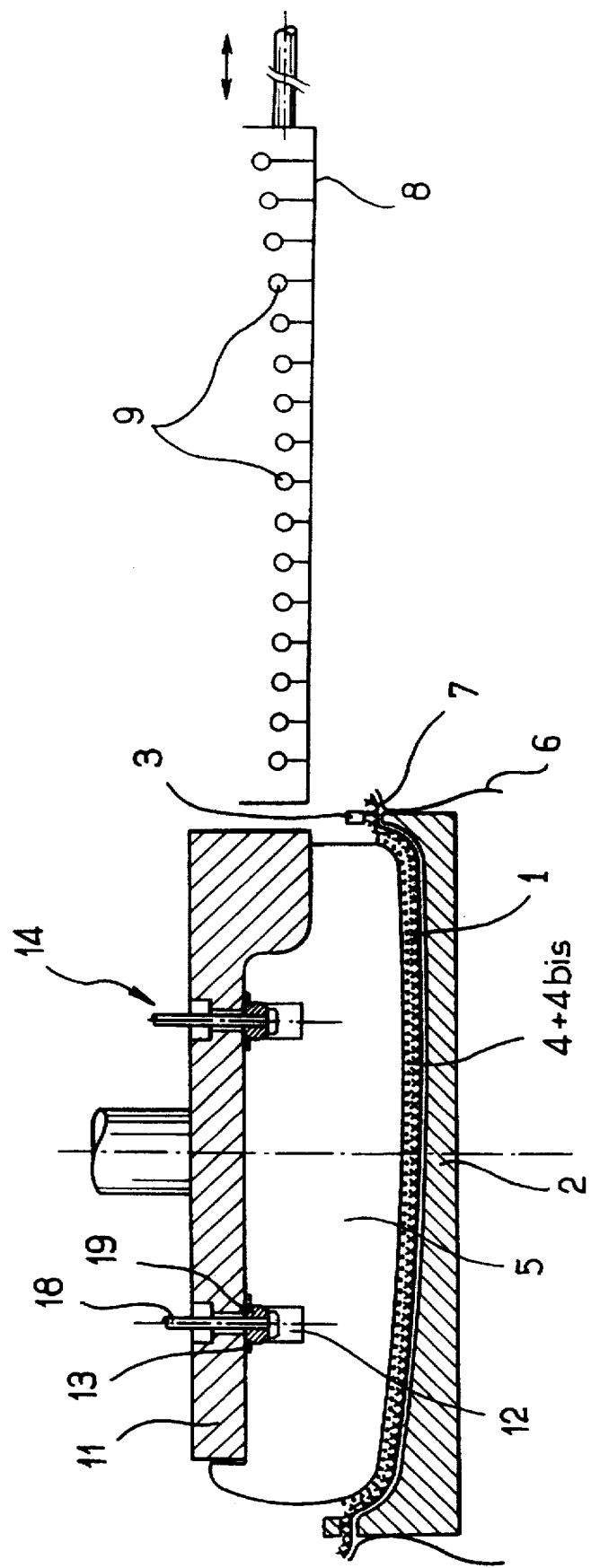
FIG. 5 is a view on a smaller scale similar to that in FIGS. 1 to 4 showing the application of the padding to the internal face of the cover.
Figure 10:
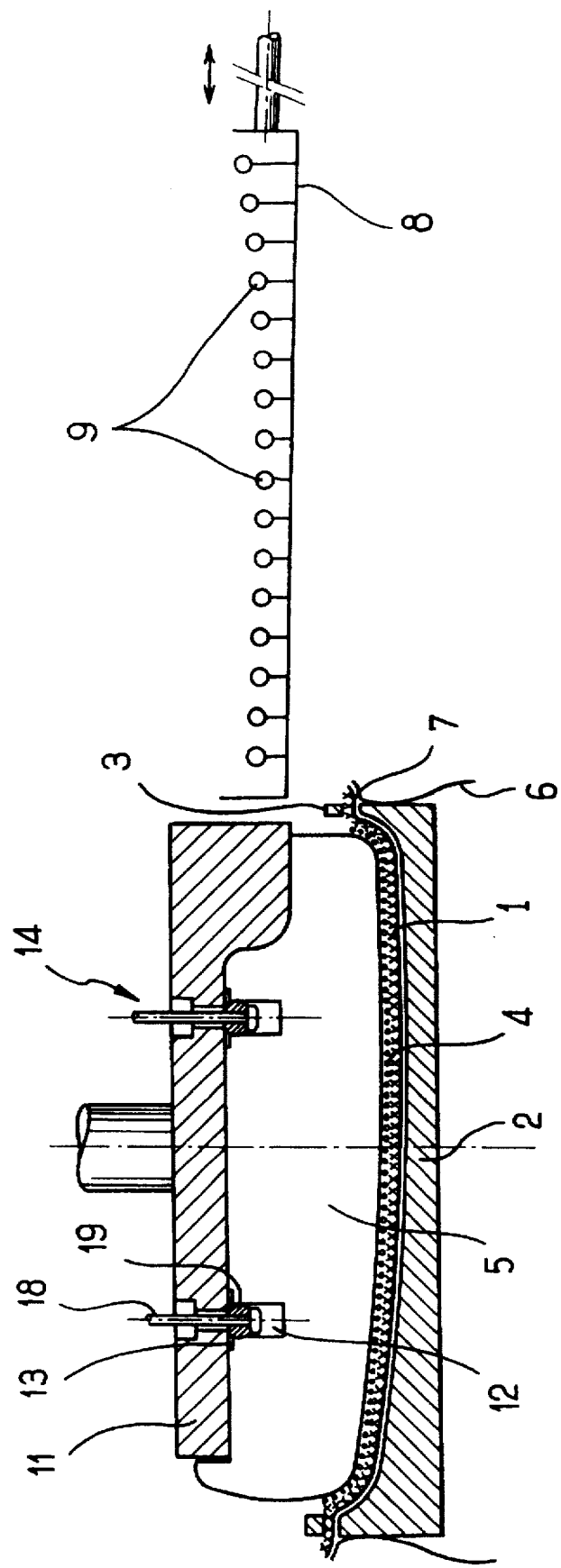
FIG. 10 is a view on a smaller scale similar to that in FIGS. 7 to 9 showing the application of the padding to the internal face o f the cover.

According to a characteristic of the invention, the box 8 is advantageously displaceably mounted in the manner of a drawer between the surface of the foam padding 5 and the shaping device 2, the infrared tubes or lamps 9 being supplied by a device which can be disconnected during each retraction of the box 8 from its position between the padding 5 and the shaping device 2. Thus, the disconnectable device allows the lamps or tubes 9 to be switched on at each insertion of the box 8, their supply automatically being cut off when said box 8 is retracted (FIGS. 5 and 10).

The infrared lamps or tubes 9 brought to 1300° Centigrade emit radiation 10 which, after a duration of between 2 seconds and 10 seconds, brings the surface of the foam forming the padding 5 to a temperature of about 170° to 190° Centigrade.

Thus, in the first embodiment, the radiation 10 also brings the adhesive 4 remaining on the foam padding 5 to the same temperature of 170° to 190° Centigrade. The first effect of this is to cause the melting of the layer of wax common to the surfaces of all foam paddings such as the foam padding 5 and constituting a substantial part of its molding skin, this melting wax being absorbed within the layer of adhesive and consequently being totally neutralized, that is to say almost eliminated. This concomitantly has the second effect of polymerizing said layer of adhesive at very high temperature to form a slightly gritty dry layer 4b is integral with the cellular surface of the foam padding 5 and which constitutes, like a primer, a fastening surface which will greatly assist future adhesion.

According to a further characteristic of the invention, the foam constituting the padding 5 has dark coloring, preferably dark grey, which is imparted to the foam by the addition of a black colorant advantageously consisting of carbon black pasted in a polyol in a proportion of 0.1 to 1 part of colorant per 100 parts of polyol, for a polyurethane foam. This coloring is intended to give the foam an adequate heat absorbing power and, hence, a good heat store. The temperature of 170° to 190° Centigrade to which the surface of the foam padding 5 is brought can therefore be achieved more easily.

In fact, the dark grey coloring of the foam increases its emissivity by reducing the reflection of incident energy and consequently increases the quantity of energy absorbed by the foam, and this determines the heat storage capacity of the foam heated in this jay. This heat store is such that the temperature thus absorbed can be employed for a period of up to 10 seconds, in other words the temperature is still sufficiently high to allow rapid setting of the adhesive during application of the padding 5 to the internal walls of the cover 1 coated with adhesive 4 in the cold shaping device 2.

The lamps or more generally the tubes 9 are preferably quartz infrared emitters with a tungsten filament which emit short, high intensity, infrared radiation of which the power is 3000 Watts per tube such as, for example, Philips brand tubes. These tubes are positioned at a distance of 50 mm to 200 mm from the surface of the foam padding 5, depending on the emissivity of the dark grey colored foam.

FIGS. 5 and 10 show schematically the carrying tray 11 and a foam padding 5 which is locked there. The padding 5 is lowered by means of the carrying tray 11 in contact with the shaping device 2 containing the adhesive-coated cover 1. To this end, the box 8 operating as a drawer in the example is withdrawn in 1 to 2 seconds while the infrared tubes or lamps 9 are simultaneously extinguished. The carrying tray 11 is thus lowered in 3 seconds to 4 seconds so that the total time between the cessation of heating and the making of contact between the foam padding 5, possibly covered with the layer of polymerized adhesive forming a primer 4bis (first embodiment),and the cover 1 coated with liquid adhesive 4,is of the order of 4 seconds to 6 seconds.

Thus, according to the first embodiment of the invention and owing to the heat store obtained by the dark grey coloring of the foam and the density of the adhesive (1000 grams per liter which is much higher than the density of the foam—45 grams per liter), the temperature of the layer of polymerized adhesive forming a primer 4bis when it comes into direct contact with the adhesive 4 deposited on the internal walls of the cover 1, is still 120° to 150° Centigrade. As this temperature is instantaneously transmitted by direct contact to the adhesive 4, it therefore determines a polymerization time of 5 to 7 seconds of said adhesive 4. Therefore, the fact that not only the surface of the dark grey-colored foam padding 5 but also the layer of adhesive deposited thereon are brought to a very high temperature further increases the heat store owing to the density of the adhesive and therefore reduces the heating and/or polymerization time of the adhesive by 10 to 20% (see FIG. 5) without the constituent material of the cover 1 being affected since the heat energy is almost entirely absorbed by the adhesive 4 and the foam lining so the temperature of the cover 1 never exceeds 40° Centigrade.

According to the second embodiment and owing to the heat store obtained by the dark grey coloring of the foam, the temperature of the foam when it comes into direct: contact with the adhesive 4 is still 120° to 1400° Centigrade. This temperature which is instantaneously transmitted by direct contact to the adhesive 4 therefore determines a polymerization time of 5 seconds to 8 seconds without the material constituting the cover 1 being affected because the heat energy is almost entirely absorbed by the adhesive 1 and the foam lining so the temperature of the cover 1 never exceeds 40° Centigrade (see FIG. 10).

Adoption of the first embodiment affords a certain number of advantages including the following:

- The spraying of the adhesive not directly into the cover but onto the foam padding eliminates the risk of problematical soiling of the fabrics constituting the cover.
- The spraying of the adhesive onto the foam padding in a separate location eliminates the risk of clogging of the mechanical parts by aerosols of the adhesive.
- The very fine layer of adhesive deposited on the internal walls of the cover by the transfer of only a very small quantity of said adhesive previously deposited on the foam padding completely eliminates the risk of defects in the appearance due to collapse of the foam lining of the cover.
- The heating not only of the surface of the foam padding but also of the layer of adhesive which remained on said foam has the first effect of melting the wax constituting the surface skin common to all molded polyurethane foam paddings and of causing it to be absorbed within the adhesive layer, thus neutralizing the wax and the second effect of concomitantly polymerizing said adhesive layer and thus allowing the formation of a slightly gritty primer integral with the cellular surface of the foam padding and greatly assisting adhesion during the sticking operation. According to the invention, molded paddings of cold cure foam or of hot cure foam having fine, open and permeable molding skins originating from release agents in a solvent solution or thicker, smooth, barely permeable skins originating from release agents in an aqueous dispersion can be adhered equally well.
- The fact that not only the surface of the dark grey-colored foam padding but also the layer of adhesive deposited thereon are brought to a very high temperature increases the heat store since the density of the adhesive, that is 1000 grams per liter, is much higher than that of the foam, that is 45 grams per liter, which has the result of reducing the heating time and/or the polymerization time of the adhesive by 10 to 20% and therefore of accelerating the production cycle.

Figure 6:
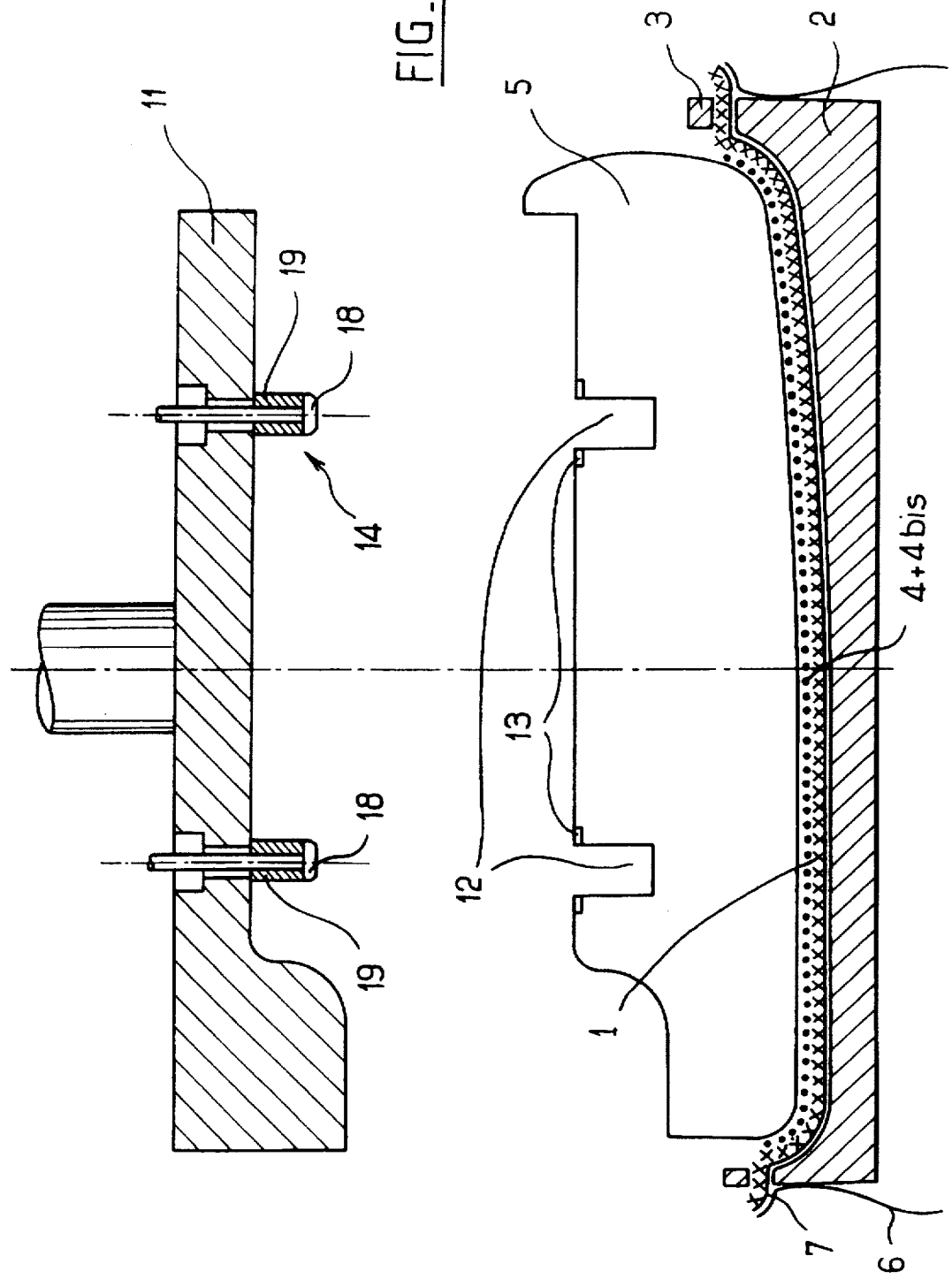
FIG. 6 is a sectional view showing the opening of the shaping device after bonding of the cover.

After polymerization of the adhesive and as shown in FIGS. 6 and 11, the foam padding 5 is unlocked from the carrying tray 11 which is then raised, thus freeing the cushion. Then, the frame 3 is opened and the cushion consisting of the foam padding 5 and the cover 1 adhering to it can be removed from the shaping device 2.

Figure 12:
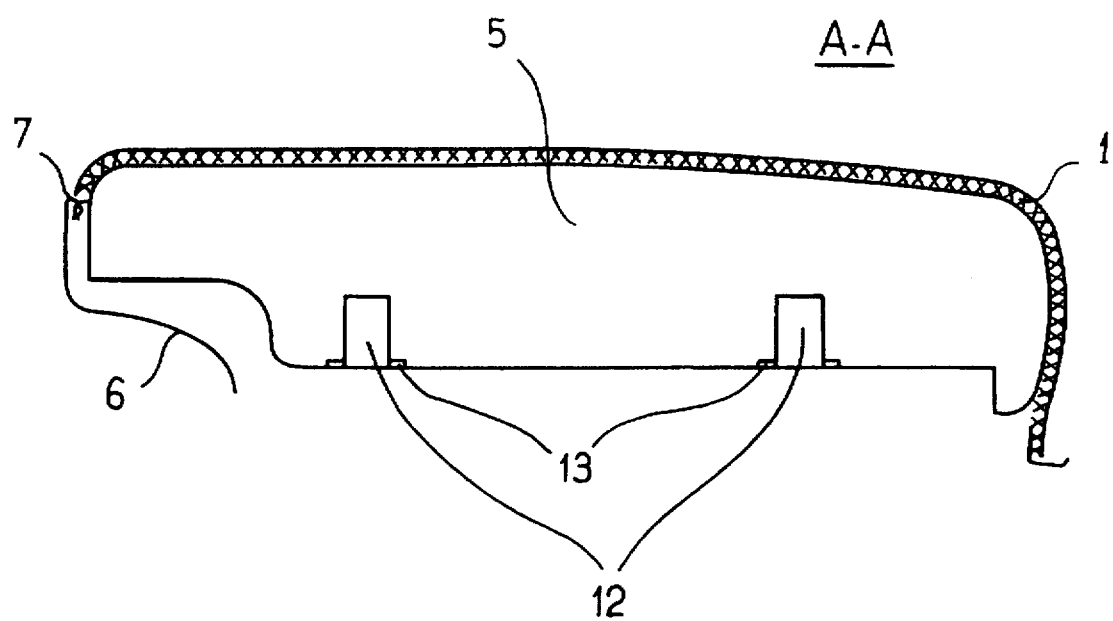
FIG. 12 is a sectional view of a cushion provide d with its cover.

The cushion obtained according to the invention and equipped with its cover is shown in FIG. 12 of the accompanying drawings.

Since the shaping device 2 in which the cover of the cushion 1 is arranged is not heated, that is to say is at the ambient temperature of the workshop, the process according to the invention allows damage to the materials constituting the cover, that is woven fabric, non-woven fabric, PVC imitation leather, velvet or natural leather to be avoided.

Contrary to the prior art, therefore, this process involves placing the adhesive 4 on the internal walls of the cover 1 previously arranged in the cold shaping device 2 either directly or indirectly via the foam padding 5 then heating to a high temperature the surface of the foam padding 5, whether previously coated or not, by radiation issuing from infrared lamps or tubes 9 and, finally, applying the thus heated foam padding 5, whether previously coated or not, to the internal walls of the cover 1 coated with adhesive 4 so that the heat from the surface of the padding 5 is instantaneously transmitted by direct contact with the adhesive 4, allowing extremely rapid setting of the adhesive 4 over a period of 2 to 10 seconds without the material constituting the cover 1 being affected because the heat energy is almost completely absorbed by the adhesive 4 and the foam lining, with the result that the temperature of the cover 1 never exceeds 40° Centigrade.

To allow perfect locking and positioning of the foam padding 5 on the carrying tray 11, the process according to the invention also involves, as shown more particularly in FIGS. 7 to 9 of the accompanying drawings, initially producing the foam padding 5 by molding, providing it, on its supporting face intended to co-operate with a carrying tray 11, with cavities 12 each provided with a positioning and locking means 13, mounting the padding 5 on the carrying tray 11 and locking it thereon by co-operation with expansible centering devices 14.

Figure 13:
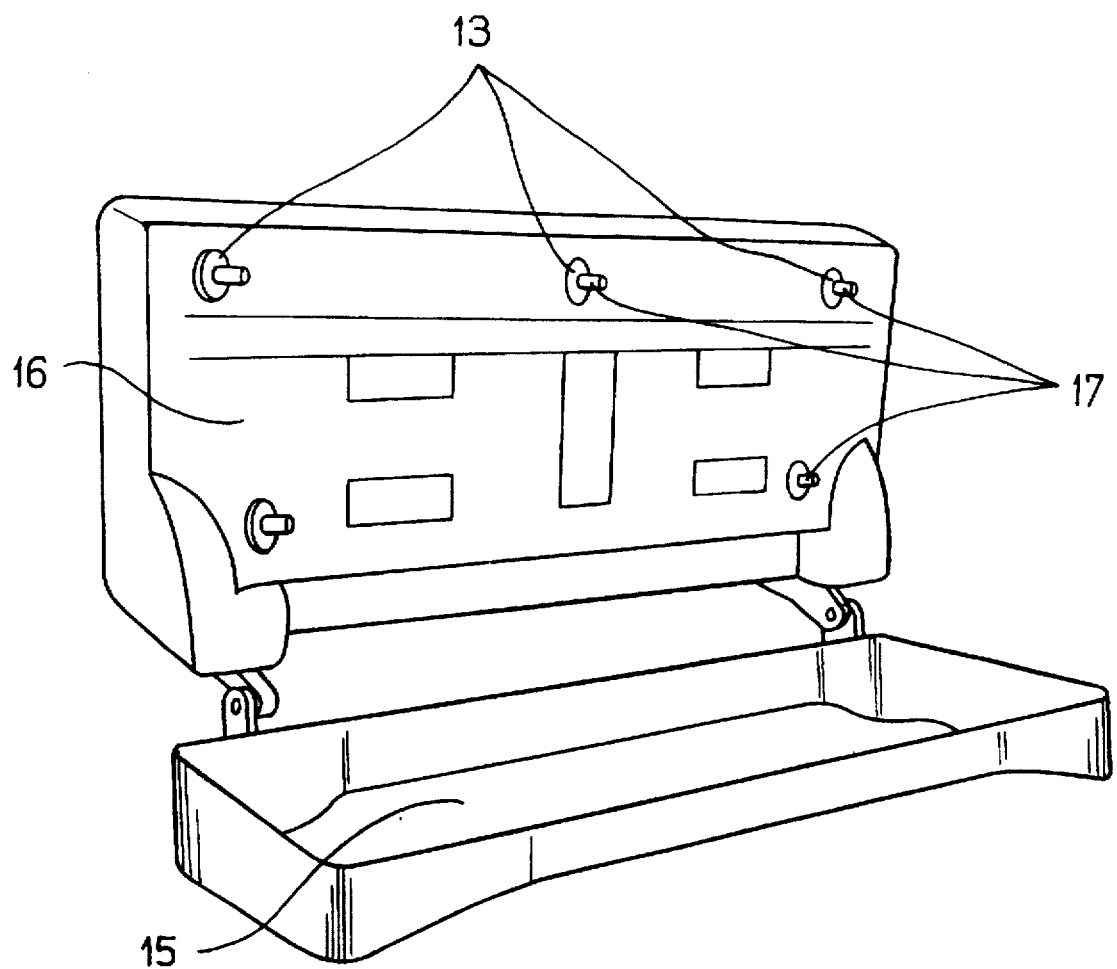
FIG. 13 is a perspective view of a mold used for the molding of a padding equipped with positioning and locking means.

As shown in FIG. 13, the padding is produced by molding in a mold consisting of a trough 15 and lid 16, the lid 16 being mounted, for example, on hinges allowing perfectly precise positioning on the trough 15.

According to a characteristic of the invention, the lid 16 is equipped with studs 17 which are screwed or welded to or are integral with said lid 16 and are each provided with a lightly force-fitted washer 13 which is made of rigid material, forms the positioning and locking means and is intended to be transferred into the corresponding surface of the padding after foaming and removal thereof from the mold.

The studs 17 are preferably cylindrical with a height of 20 mm and a diameter slightly greater than 18 mm, for example from 18.1 mm to 18.3 mm. Depending on the size of the foam padding 5, the number of studs 17 can vary from 2 to 8.

The washers 13 which can be of dense cardboard or of any other recyclable rigid material preferably have an external diameter of 50 mm and an internal diameter of 18 mm, that is very slightly smaller than the diameter of the studs 17, allowing their retention on these studs 17 to be guaranteed before and during foaming, the thickness of these washers 18 varying from 0.5 mm to 3 mm.

The dimensions mentioned for the studs 17 and the washers 13 are obviously not limiting and can vary, for example, in the case of the studs 17, from a height of 15 mm to 30 mm and from a diameter of 15 mm to 25 mm whereas the size of the washers 13 will be gauged as a function of the studs 17 receiving them.

Thus, a foaming mixture of polyurethane is poured into the foaming mold according to FIG. 13 and the lid 16 is then closed. The foaming mixture expands, fills the entire mold and partially encapsulates the washers 13 which had been slipped over the studs 17. The studs 17 simultaneously define cavities 12 in the foam which are concentric with the washers 13.

After polymerization of the foam, the lid 16 is opened and the foam padding 5 having cavities 12 corresponding to the space occupied by the studs 17 of the lid 16 is removed from the mold, the washers 13 being firmly encapsulated partially at the surface of the foam padding 5 in the region of the cavities 12. This method of production allows perfect positioning of the washers 13 of the foam paddings 5 in a completely repetitive manner.

This molding process involving insertion of washers allows the acquisition of positioning and locking means 13 for the foam padding 5 on a carrying tray 11, as mentioned in the foregoing description, guaranteeing perfect centering of the foam padding 5 on the cover 1 when the carrying tray 11 is brought mechanically onto a shaping device 2.

Figure 14:
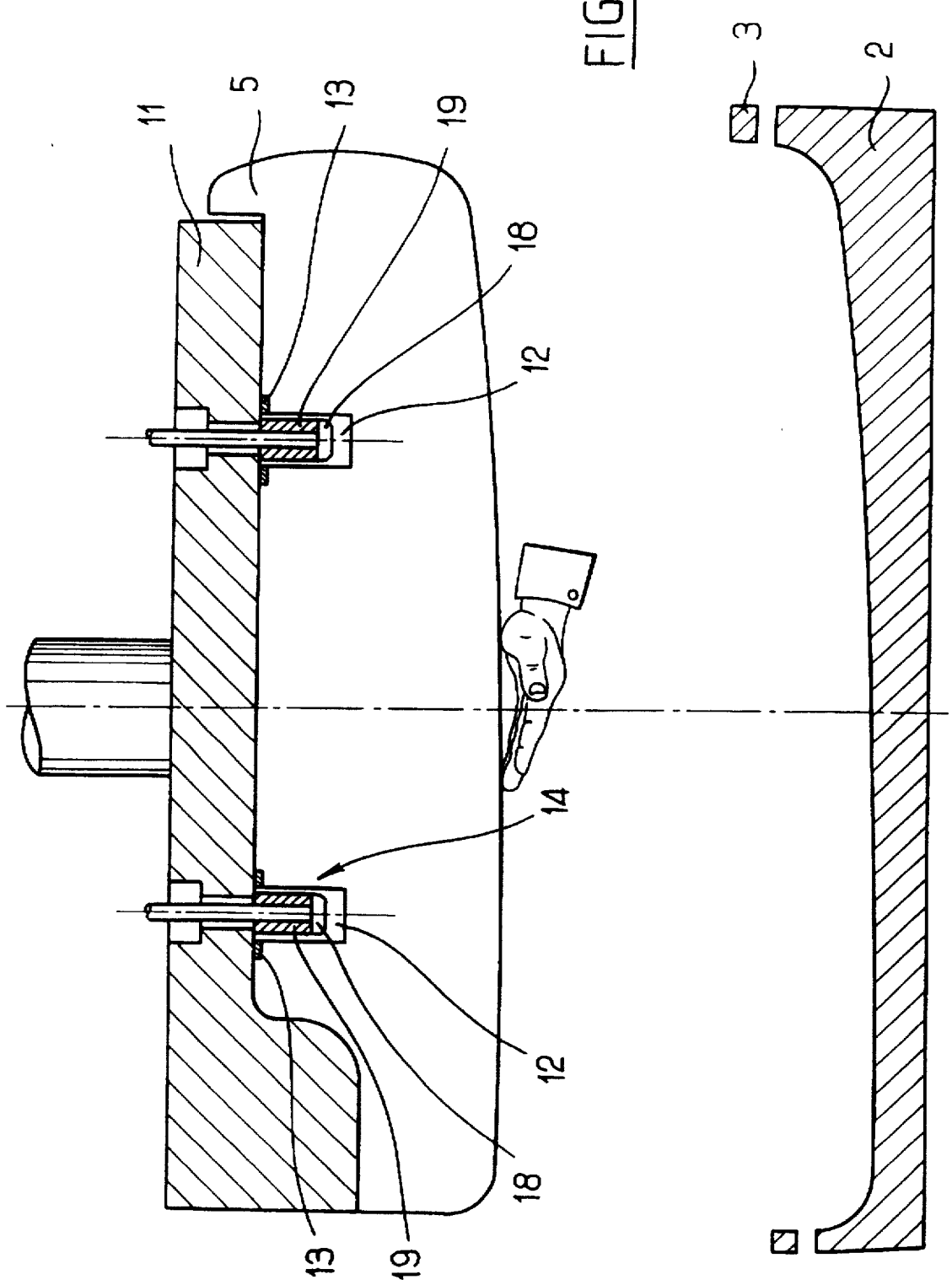

FIG. 14 of the accompanying drawings shows the carrying tray 11 equipped with expansible centering devices 14. The diameter of these devices 14 is 16 mm and their height is equal to or less than 20 mm to match the depth of the cavities 12 defined by the studs 17. These devices 14 each schematically consist of a small pneumatic jack 18 surrounded by a ring 19 of flexible rubber or similar material. When the small jacks 18 are actuated upwardly (FIG. 9), they compress the rubber rings 19, giving them a substantially spherical shape with a diameter of 20 mm.

FIG. 14 shows the easy positioning of the foam padding 5 on the carrying tray 11, the internal diameter of the washers 13 being greater than that of the devices 14 which are inserted in the cavities 12.

FIG. 15 shows the deformation, after actuation of the jacks 18, of the rubber rings 19 which has the effect of increasing their diameter leading, on the one hand, to perfect centering of the foam padding 5 on the carrying tray 11 and, on the other hand, its locking on said carrying tray 11 by the pressure exerted by the deformed rubber rings 19 against the internal diameter of the washers 13. Unlocking takes place in the reverse sequence by actuating the small jacks 18 downwardly, thus decompressing the rubber rings 19 which, in the rest position, return to their original diameter of 16 mm, and this has the effect of freeing the washers 13 and consequently the foam padding 5.

The dimensions mentioned for the expansible centering devices 14 are obviously not limiting. The devices 14 will be gauged to any dimensions to match the size of the studs 17 and washers 13.

The provision of positioning and locking means 13 arranged perfectly precisely and reproducibly at the surface of the foam forming the padding 5, allows the padding 5 to be positioned by means of expansible centering devices 14 and to be locked on the carrying tray 11 and consequently to bring about exact positioning of the foam padding on the cover while avoiding all faults known hitherto, that is poorly positioned seams, creases, etc.

The present invention has been described with regard to a padding of polyurethane foam. However, the process according to the invention can also be applied when the padding consists of latex foam, rubberized hair, or interlaced polyester fibers.

Finally, the process can be applied to a polyurethane foam padding whether it is manufactured by molding or by cutting from a block of foam.

By means of the invention it is possible to bond a cover to a shaped padding, in particular of polyurethane foam, in particular for the production of seat cushions, by carrying out a sequence of operations allowing almost instantaneous polymerization of the adhesive between the cover and the padding while using a cold shaping device and without the risk of deterioration of or damage to the visible surface of the cover.

Furthermore, the invention allows perfect centering of the padding relative to the cover.

Obviously the invention is not limited to the embodiment described and illustrated in the accompanying drawings.

Modifications are possible, in particular with regard to the constitution of the various elements or by substitution of technical equivalents, without departing from the sphere of protection of the invention.

We claim:

1. Process for adhesive bonding a cover to a foam padding shaped in a form of a seat cushion, said padding having a cellular surface to be bonded to the cover, said process comprising the steps of:

arranging the cover in a cold-shaping device, fixing said cover to the device by means of a holding frame, said cover having a wall contacting the cold-shaping device and internal walls to be bonded to the padding;

placing thermosensitive adhesive in the range of 10 to 20 grams per square meter on the internal walls of the cover by coating said padding surface to be bonded to the cover with a moist thermosensitive adhesive and placing the coated surface against the internal walls for 0.5 to 2 seconds;

separating the foam padding surface and a portion of the adhesive from the internal walls of the cover and heating the coated surface of the padding to a temperature in the range of 170° to 190° C., said heating polymerizing the portion of adhesive on the surface of the foam to form a gritty, dry primer integral with the cellular surface of the padding;

immediately after heating, applying the heated padding surface to the internal walls of the cover to bring about instantaneous transmission of heat to the adhesive on the internal walls of the cover thereby rapidly setting the adhesive on the internal walls to bond the cover to the foam padding; and removing the padding and bonded cover from the cold-shaping device.

2. Process according to claim 1, characterized in that the cold-shaped device (2) is formed of synthetic material, of sheet metal, of cast iron or of composite materials.

3. Process according to claim 1, characterized in that the surface of the padding is coated with moist adhesive by spraying.

4. Process according to claim 3, characterized in that a quarter to a third of the adhesive applied by spraying to the padding is placed onto the cover.

5. Process according to claim 4, characterized in that the quantity of adhesive initially deposited on the foam padding (5) is between 40 grams and 60 grams per square meter, a quantity of adhesive of 30 grams to 40 grams per square meter remaining on the foam padding (5).

6. Process according to claim 1, characterized in that the thermosensitive adhesive used is a thermosetting polyurethane adhesive containing 100% of dry extracts and having two components, that is 70% by weight of polyol having a molecular weight of 6000 and a hydroxyl index of 28 and 30% by weight of MDI type isocyanate, the mixture being activated by an amine catalyst.

7. Process according to claim 1, characterized in that the thermosensitive adhesive used is a single-component polyurethane adhesive containing 100% of dry extracts or additions of solvents, an aqueous phase or solvent rubber adhesive.

8. Process according to claim 1, characterized in that the heating of the surface of the foam padding (5) is effected by means of a box (8) in which there are installed infrared lamps or tubes (9) brought to a temperature of between 1000° and 1400° Centigrade and mounted on supports which are adjustable relative to the base of the box (8) so that they are all at the same distance from the surface of the foam constituting the padding (5).

9. Process according to claim 8, characterized in that said box (8) is displaceably mounted in the manner of a drawer between the surface of the foam padding (5) and the shaping device (2), the infrared tubes or lamps (9) being supplied by a device which can be disconnected during each retraction of the box (8) from its position between the padding (5) and the shaping device (2).

10. Process according to claim 1, characterized in that wax is present in the surface of the foam padding and said heating melts said wax such that it is absorbed by the adhesive.

11. Process according to claim 1, characterized in that the foam constituting the padding (5) has dark coloring, which is imparted to the foam by the addition of a black colorant advantageously consisting of carbon black pasted in a polyol in a proportion of 0.1 to 1 part of colorant per 100 parts of polyol, for a polyurethane foam.

12. Process according to claim 1, characterized in that the padding is held during processing by a carrying tray, said padding having a supporting face with cavities for mounting said padding on the carrying tray, each cavity having positioning and locking means which cooperate with expansible centering devices on the carrying tray.

13. Process according to claim 12, characterized by molding the padding in a mold wherein the mold comprises a trough and a lid, said lid mounted on hinges to allow perfect positioning of the lid on the trough, and said lid being equipped with studs which are screwed or welded or integral with said lid, each stud equipped with a lightly force-fitted washer made of a rigid material; wherein during molding of the padding each stud defines a cavity of the padding and each washer is encapsulated in the padding, such that when the padding is removed from the mold each washer is concentric with a cavity and forms said positioning and locking means.

14. Process according to claim 13, characterized in that the washers (13) are of dense cardboard or of any other recyclable rigid material.

15. Process according to claim 12, characterized in that the centering devices (14) each consist of a small pneumatic jack (18) surrounded by a ring (19) of flexible material.

* * * * *